United States Patent [19]
Rolland et al.

[11] Patent Number: 4,985,169
[45] Date of Patent: Jan. 15, 1991

[54] COMPOSITIONS BASED ON CHLOROFLUORINATED ETHER AND SOLVENT AND THEIR APPLICATION IN ABSORPTION APPARATUS

[75] Inventors: Laurence Rolland, Sceaux; René Bertoochio, Vourles Par Vernaison; Jacques Cheron, Maisons Laffite, all of France

[73] Assignees: Atochem, Gas de France; Institut Francais du Petrole, both of France

[21] Appl. No.: 506,541

[22] Filed: Apr. 6, 1990

Related U.S. Application Data

[62] Division of Ser. No. 264,072, Oct. 28, 1988.

[30] Foreign Application Priority Data

Oct. 30, 1987 [FR] France .................. 87 15095
Oct. 30, 1987 [FR] France .................. 87 15101

[51] Int. Cl.$^5$ .................. C09K 5/00; F25B 5/00
[52] U.S. Cl. .................. 252/69; 62/4; 62/114; 252/67
[58] Field of Search .................. 252/67, 68, 69; 62/4, 62/114

[56] References Cited

FOREIGN PATENT DOCUMENTS

| | | |
|---|---|---|
| 0143509 | 6/1985 | European Pat. Off. . |
| 3202377 | 1/1982 | Fed. Rep. of Germany . |
| 3524737 | 11/1987 | Fed. Rep. of Germany . |

*Primary Examiner*—Paul Lieberman
*Assistant Examiner*—John F. McNally
*Attorney, Agent, or Firm*—Morgan & Finnegan

[57] ABSTRACT

The invention relates to compositions which contain a chlorofluorinated ether and at least one solvent, and their use in thermal absorption apparatus for the generation of heat or cold.

In the compositions according to the invention, the chlorofluorinated ether is 1-difluoromethoxy-1,1,2-trifluoro-2-chloroethane (enflurane: $CF_2H-O-CF_2CHFCl$) and the solvent is selected among aromatic esters and $\omega,\omega'$-dialkylated polyoxyethylene glycols.

The present invention can be particularly applied in the heating and refrigeration areas using absorption systems such as, for example, heat pumps.

7 Claims, No Drawings

COMPOSITIONS BASED ON CHLOROFLUORINATED ETHER AND SOLVENT AND THEIR APPLICATION IN ABSORPTION APPARATUS

This is a Division of application of application Ser. No. 264,072, filed Oct. 28, 1988.

FIELD OF THE INVENTION

The present invention relates to mixtures of fluids containing a chlorofluorinated ether and at least one solvent, as well as their use in thermal absorption apparatus for heating and/or cooling.

BACKGROUND OF THE INVENTION

The principle of the absorption cycle of such machines is the following: the working fluid, which is initially in the gaseous phase, undergoes condensation, expansion, and vaporization steps, then an absorption step in a solvent fluid. The resulting solution is pressurized again. An increase in the temperature regenerates the working fluid in the gaseous phase in a boiler. The solvent is then sent to the absorption step.

The working fluid-solvent fluid pairs which are most frequently used are the $NH_3$—$H_2O$ and $H_2O$—$LiBr$ pairs. However, these pairs exhibit major drawbacks which prevent their use in certain areas, particularly in individualized or collective heating operations. In fact, the $NH_3$—$H_2O$ pair, which is interesting from a thermodynamic point of view, has restricted use because $NH_3$ is toxic. The $H_2O$—$LiBr$ pair cannot be used at the low temperatures required in the evaporator when used in a heat pump to heat individual dwellings or group dwellings because of the crystallization of the water.

In an absorption cycle, it is important that the working fluid-solvent fluid pair exhibits good thermodynamic properties, that a satisfactory solubility of the working fluid in the solvent exists, and that it is not toxic and does not crystallize.

In addition, it is preferred that the solvent have a normal boiling point which is preferably higher than 100° C. to facilitate separation in the boiler.

For this purpose, the use of chlorofluorinated hydrocarbons as working fluids with heavy compounds as solvents has already been proposed (Revue Generale de Thermique -Nos. 236-237 (August-September, 1981).

The use of these working fluid-solvent fluid pairs in an absorption cycle is certainly interesting, particularly because the working fluid has a very high solubility in the solvent. However, such pairs decompose at high temperatures when they are in contact with a metal compound, while each component of the pair is thermally stable under the same conditions. However, it is crucial for a heating installation with an absorption cycle to have a working fluid-solvent system which is stable for a period equivalent to 10 years of operation. This is also of crucial important for air conditioning and refrigeration installations.

Consequently, the proposal has been made to inhibit the decomposition reaction by introducing, in these working fluid-solvent fluid pairs, suitable and effective stabilizing additives as described in U.S. Pat. No. 4,612,133.

It has also been suggested to use mixtures of chlorofluorinated hydrocarbons and chlorofluorinated compounds, without the addition of a stabilizer, as fluid pairs for absorption heat pumps, as described in French patent application No. 2,575,174 and U.S. Pat. No. 4,647,391.

It is also possible to use fluorinated compounds which do not belong to the group of chlorofluorinated hydrocarbons having 1 or 2 carbon atoms. An example is European Patent No. 143,509, which proposes the use, as a working fluid, of acyclic, linear, branched, or cyclic hydrocarbons and fluorinated ethers containing from 3 to 5 carbon atoms, with a general formula which exclusively contains carbon, hydrogen, fluorine, and oxygen, for the ether used.

When fluorinated ethers are used as working fluids, the solvent is tetraglyme or, more generally, any compound with proton-acceptor properties.

The use of fluorinated ethers as working fluids is particularly interesting because these compounds are not toxic and are therefore already used in anesthesia. In addition, these compounds are very soluble in most of the solvents, especially when they contain chlorine atoms. On the other hand, however, the presence of this element results in a lowering of the stability of the working fluid-solvent pair in the presence of metals at temperatures usually reached in the boiler of absorption apparatus.

In fact, it is well known that a chlorofluorinated hydrocarbon of the $C_nH_{2n+2-x-y}F_xCl_y$ type, when heated in the presence of iron, aluminum, or copper, and a hydrogen donor compound, undergoes a transformation which can sometimes be quantitative, with substitution of the chlorine atoms by hydrogen atoms from the solvent. Thus, it has been shown in U.S. Pat. No. 4,612,133 that 1-chloro-2,2,2-trifluoroethane, under these conditions, leads to trifluoroethane according to the following reaction scheme:

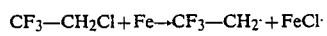

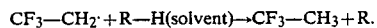

In chlorofluorinated hydrocarbons which contain at least 2 carbon atoms, olefin is formed:

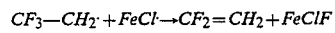

In chlorofluorinated ethers, this instability is amplified by the presence of the ether function. Thus, 1-methoxy-1,1,2-trifluoro-2-chloroethane ($CH_3$—O—$CF_2$—CHFCl) is completely decomposed after 100 hours at 180° C. regardless of the solvent used. The same holds for 1-difluoromethoxy-1-chloro-2,2,2-trifluoroethane (isoflurane: $CF_2H$—O—$CHCl$—$CF_3$), with the principal decomposition products resulting from the transfer of the chlorine atom onto fragments of the solvent molecules being: $CH_3Cl$, $C_4H_9Cl$, etc.

The preceding references are hereby incorporated by reference.

DESCRIPTION OF THE INVENTION

It has now been discovered that 1-difluoromethoxy-1,1,2-trifluoro-2-chloroethane (enflurane: $CF_2H$—O—$CF_2CHFCl$; exhibits, under the same conditions, good stability when it is combined with a solvent selected from aromatic esters and $\omega,\omega'$-dialkylated polyoxyethylene glycols. This stability is especially surprising because with other solvents, Enflurane is dechlorinated, according to the reaction described below for chlorofluorinated hydrocarbons.

$CF_2H-O-CF_2-CHFCl \rightarrow CF_2H-O-CF_2-CH_2F$

Thus, the purpose of the invention is the production of compositions which contain a chlorofluorinated ether and at least one solvent, which can be used, for example, in heating or cooling absorption apparatus, characterized by the fact that the chlorofluorinated ether is 1-difluoromethoxy-1,1,2-trifluoro-2-chloroethane and the solvent is selected from aromatic esters and ω,ω'-dialkylated polyoxyethylene glycols.

Aromatic esters according to the present invention are, for example, particularly, benzene mono- and diesters with the formula:

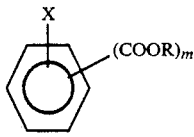

(I)

where X designates a hydrogen atom or a methyl radical, m is equal to 1 or 2, and R represents a linear or branched alkyl radical containing from 1 to 8 carbon atoms.

Examples of such esters are methyl benzoate (bp: 199° C.) or ethyl benzoate (213° C.), methyl-2-methyl benzoate (bp: 215° C.) or ethyl-2-methyl benzoate (bp: 227° C.), as well as o-phthalic acid diesters such as, for example, dimethyl phthalate (bp: 282° C.), diethyl phthalate (bp: 299° C.), dipropyl phthalate (bp: 317° C.), dibutyl phthalate (bp: 340° C.), or di(2-ethylhexyl) phthalate (bp: 384° C.).

The ω,ω'-dialkylated polyoxyethylene glycols according to the present invention can be represented by the formula:

$$R_1-(OCH_2CH_2)_n-OR_2 \quad \text{(II)}$$

where n is an integer from 1 to 4, and the symbols $R_1$ and $R_2$, which can be different or identical, each represent a linear or branched alkyl radical containing from 1 to 8 carbon atoms.

Examples of such solvents, are dimethyl ethers or diethylene glycol: $CH_3O-(C_2H_4O)_2-CH_3$ (bp: 160° C.) or tetraethylene glycol: $CH_3O(C_2-H_4O)_4-CH_3$ (bp: 276° C.), diethylene glycol diethyl ether: $C_2H_5O-(C_2H_4O)_2-C_2H_5$ (bp: 189° C.), and diethylene glycol dibutylether: $C_4H_9O-(C_2H_4O)_2-C_4H_9$ (bp: 256° C.).

Among the above-mentioned solvents, the preferred ones are methyl benzoate, diethylene glycol, dimethyl ether, and tetraethylene glycol dimethyl ether.

According to the invention, the above-mentioned mixtures of fluids can be used particularly in heat pumps. There the gaseous working fluid is successively subjected to condensation in a heat-exchange process with a medium which constitutes a heat receiver, to a lowering of the pressure of the condensed fluid, to evaporation of the low-pressure fluid in a heat-exchange process with a cold medium, which constitutes a heat absorption source, in a solvent as defined above. This process is followed by a step comprising increasing the pressure of the resulting enriched solution, heating of the pressurized solution to vaporize the working fluid, recycling of the gaseous working fluid which is produced by the condensation, draining of the resulting exhausted solution, lowering of its pressure, and its return to the absorber.

In an application of such thermal absorption apparatus for heat production and/or cold production, the relative amounts of 1-difluoromethoxy-1,1,2-trifluoro-2-chloroethane and the solvent are determined according to a known method as a function of the operating conditions of the absorption cycle. It is advantageous to use 5 to 80% of the working fluid in the mixture of the working fluid and the solvent.

EXAMPLES

To demonstrate the performances while using the mixtures of fluids according to the invention in thermal absorption apparatus, tests are conducted to determine the stability and solublity given in the following nonlimiting examples. These should be compared to tests not conducted according to the present invention.

A. STABILITY TESTS

Example 1

A composition is prepared by mixing 5 mmol of 1-difluoro-methoxy-1,1,2-trifluoro-2-chloroethane (enflurane) and 3 g of methyl benzoate. The stability of this composition is tested for 100 hours at 180° C. according to the following protocol: the mixture is introduced into a thick-walled Pyrex tube which contains a 250-mg metal test tube made of ordinary steel which is suitably clean. The tube is cooled to the temperature of liquid nitrogen, sealed under vacuum, and its temperature is raised to 180° C. for 100 hours. The tube is then again immersed in the liquid nitrogen, connected to vacuum, and opened by an appropriate device. The volatile products are recovered by low-temperature trapping and are analyzed by gasphase chromatography. The amount of working fluid which remained in the liquid phase is assayed by gas-phase chromatography using the internal standard method. The decomposition rate of the working fluid is 0.9% based on the average of the two tests.

By increasing the test duration to 700 hours, the decomposition rate of the working fluid reached only 5.8%.

Example 2

Example 1 is repeated, replacing the methyl benzoate with diethylene glycol dimethyl ether. The decomposition percentage of the working fluid then did not exceed 4.7%.

Example 3

Example 1 is repeated, replacing the methyl benzoate with tetraethylene glycol dimethyl ether. The decomposition percentage of the working fluid is not higher than 4.9%, based on the average of the two tests.

The following tests a to d are given as control examples and should be compared to Examples 1 to 3 which illustrate the invention:

Test a

The process described in Example 1 is repeated, except that the composition according to the invention is replaced with a mixture of 5 mmol of 1-methoxy-1,1,2-trifluoro-2-chloroethane and 3 g of N-methylpyrrolidone. After 100 hours at 180° C., the analysis shows that 97% of the chlorofluorinated ether disappeared.

Test b

The process described in Example 3 is repeated, except that the methyl benzoate is replaced with N-methylpyrrolidone, using a 292-mg metal test tube. The decomposition percentage of the working fluid reaches 63%.

Test c

The process described in Example 2 is repeated, except that the 1-difluoromethoxy-1,1,2-trifluoro-2-chloroethane is replaced with 1-methoxy-1,1,2-trifluoro-2-chloroethane ($CH_3$—O—$CF_2$—CHFCl). The decomposition percentage of the working fluid is 100%. The principal conversion products identified by gas-phase chromatography are dioxane and dimethyl ether.

Test d

The process described in Example 3 is repeated, except that the 1-difluoromethoxy-1,1,2-trifluoro-2-chloroethane is replaced with 1-difluoromethoxy-2,2,2-trifluoro-1-chloroethane (isoflurane). The decomposition percentage of the working fluid reached 96%. The principal products of the conversion identified by gas phase chromatography are dioxane, dimethyl ether, and methyl chloride.

The following examples illustrate the surprising stability properties of the mixtures of fluids according to the invention, which are therefore particularly suited for use in thermal absorption apparatus for the production of heat and/or cold.

B. SOLUBILITY TESTS

A high solubility of the working fluid in the solvent results in a low solution flow rate of the solute-solvent and therefore decreases the work load of the circulation pump. In addition, a good solubility is usually accompanied by a high heat of the mixture, which favors reductions in investment costs.

The solubility can be indirectly characterized by the activity coefficient at an infinite dilution $\gamma\infty$.

In fact, the partial pressure of component A in the above mixture is given by:

$$pA = \gamma A X A P A \text{ (at constant T)}$$

with:
pA = partial pressure of component A
PA = vapor tension of pure product A at the constant temperature T
XA = molar ratio of component A
$\gamma$A = activity coefficient of component A For the same value of pA, XA (concentration in the liquid phase or the solubility) increases as $\gamma$A decreases.

Particularly, a good solubility is characterized by $\gamma \leq 1$.

It is possible to determine the value of $\gamma$ for very small values of the concentration of compound A (infinite dilution) based on the measured retention time (time elapsed during chromatography between the injection and detection of compound A).

The protocol selected for the measurements is the following: the solvent to be studied is deposited, at a known weight, on the chromatography column so as to obtain an impregnation rate of approximately 10 to 20 g of solvent per 100 g of substrate.

The solute studied is injected in very small amounts, 50 μL for gaseous solutes or 0.2 μL for liquid solutes, in the flow of the vehicle gas, helium (flow rate of 30 cc/min).

For each solute, two injections generally suffice.

The measurement of the retention time is obtained using an integrator connected to the chromatograph and a recording device which permits the visualization of the formation and structure of the peaks and permits the detection of any abnormality: shift in the base line, peaks which are too far apart, . . .

In the following examples, the solubility ($\gamma\infty$) of the 1-difluoromethoxy-1,1,2-trifluoro-2-chloroethane (enflurane) in various solvents is compared to the solubility obtained with the following fluorinated hydrocarbons: chlorodifluoromethane (R22 = $CHClF_2$), trifluoromethane (R23 — $CHF_3$), 1-2,dichloro-1,1,2,2-tetrafluoroethane (R114 = $CClF_2$ — $CClF_2$), and 1-chloro-1,2,2,2-tetrafluoroethane (R124 = $CF_3CHClF$).

EXAMPLE 1

The solvent deposited on the chromatography column is methyl benzoate, $C_6H_5COOCH_3$.

The results obtained with various solutes at 20° C. are summarized below:

|  |  | $\gamma\infty$ at T = 20° C. |
|---|---|---|
| Solute | R22 | 1 |
|  | R23 | 2.5 |
|  | R114 | 6.8 |
|  | R124 | 1.4 |
|  | enflurane | 0.6 |

As can be seen, the best measured solubility is that for the enflurane-methyl benzoate pair.

EXAMPLE 2

The solvent deposited on the chromatography column is diethylene glycol dimethyl ether, $CH_3O(CH_2CH_2O)_2CH_3$.

The results obtained with various solutes at 20° C. are summarized below:

|  |  | $\gamma\infty$ at T = 20° C. |
|---|---|---|
| Solute | R22 | 0.2 |
|  | R23 | 0.5 |
|  | R114 | 3.6 |
|  | R124 | 0.25 |
|  | $HCF_2$—$OCF_2H$ | 180 |
|  | $HCF_2CF_2$—$OCH_3$ | 0.7 |
|  | enflurane | 0.2 |

The low value of $\gamma\infty$ for the enflurane-diethylene glycol dimethyl ether pair is thus synonymous with a good mutual solubility. The enflurane has a much better solubility than the fluorinated ethers which do not contain chlorine.

C. EXAMPLE OF APPLICATION IN A HEAT PUMP

A mixture of 1-difluoromethoxy-1,1,2-trifluoro-2-chloroethane and methyl benzoate is used in a heat pump.

For this purpose, a conventional device is used which forms a sealed closed circuit containing the following in a serial connection:
 a condensation exchanger for the working fluid which is connected to the heat-exchange process by an external medium to be heated, which constitutes a heat receiver,
 a pressure lowering device,
 an evaporation exchanger which is connected by a heat exchange process with a cold medium such as, for example, air or water, which constitutes a heat source in the circuit, a contactor for the absorption of the working fluid into the solvent, a pump used to raise the pressure, and a boiler used to regenerate the working fluid into the gaseous phase, for which the boiler is heated by any suitable means such as, for example, a gas, fuel, or other heating device.

It was observed that the results obtained are surprising, particularly regarding stability, because after an operation of approximately 100 hours, the decomposition rate of the working fluid is approximately 0.9%.

The examples therefore show the high-use value of the compositions according to the invention in heating and cooling uses which use absorption systems such as, for example, heat pumps.

Clearly, the invention is in no way limited to the modes of implementation described and illustrated which are given here only as examples. On the contrary, the invention includes all technical equivalents of the means described, as well as their combinations, if they are implemented according to the aims or the invention.

We claim:

1. A method of operating a thermal absorption apparatus which generates heat and/or cold in a closed circuit wherein the working fluid comprises a mixture of fluids comprising 1-difluoromethoxy-1,1,2-trifluoro-2-chloroethane and at least one solvent selected among aromatic esters and the $\omega,\omega'$-dialkylated polyoxyethylene glycols.

2. The method according to claim 1, wherein the solvent has a standard boiling point higher than 100° C.

3. The method according to claim 1, wherein the solvent is an aromatic ester with the formula:

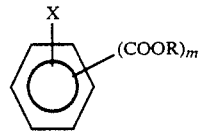
(I)

in which X designates a hydrocarbon atom or a methyl radical, m is equal to 1 or 2, and R represents a linear or branched alkyl radical which contains from 1 to 8 carbon atoms.

4. The method according to claim 1, wherein the solvent is methyl benzoate.

5. The method according to claim 1, wherein the solvent is $\omega,\omega'$-dialkylated polyoxyethylene glycol with formula:

$$R_1-(OCH_2CH_2)_n-OR_2 \quad (II)$$

in which n is an integer from 1 to 4, and the symbols $R_1$ and $R_2$, which may represent identical or different radicals, each represent a linear or branched alkyl radical which contains from 1 to 8 carbon atoms.

6. The method according to claim 1, wherein the solvent is diethylene glycol or tetraethylene glycol dimethyl ether.

7. The method according to claim 1, wherein the gaseous working fluid is successively subjected to a condensation, which is connected by a heat-exchange process to a medium which constitutes a heat receiver, to a lowering of the pressure of the condensed, to an evaporation of the low-pressure fluid which is connected by a heat-exchange process to a cold medium which constitutes a heat source, and to an absorption in a solvent such as defined in claim 1, and the pressure of the resulting enriched solution is elevated, then the pressurized solution is heated so as to vaporize the working fluid, the gaseous working fluid resulting from the condensation is recycled, the resulting exhausted solution is drained, its pressure is reduced, and it is returned to the absorber.

* * * * *